(No Model.)

H. AIKEN.
MILL APPLIANCE.

No. 393,051. Patented Nov. 20, 1888.

WITNESSES:
Danny S. Wolcott
F. E. Gaither

INVENTOR,
Henry Aiken,
by George H. Christy, Att'y.

N. PETERS, Photo-Lithographer, Washington, D. C.

UNITED STATES PATENT OFFICE.

HENRY AIKEN, OF HOMESTEAD, PENNSYLVANIA.

MILL APPLIANCE.

SPECIFICATION forming part of Letters Patent No. 393,051, dated November 20, 1888.

Application filed October 8, 1888. Serial No. 287,516. (No model.)

*To all whom it may concern:*

Be it known that I, HENRY AIKEN, a citizen of the United States, residing at Homestead, in the county of Allegheny and State of Pennsylvania, have invented or discovered certain new and useful Improvements in Mill Appliances, of which improvements the following is a specification.

In rolling-mill plants it is customary to employ inverted casters for the transference of large pieces of metal from one part of the plant to another—as, for example, from the rolls to the shearing mechanism, or from one shearing mechanism to another. These casters are arranged at different distances apart, dependent upon the character and size of the bodies of metal to be supported thereby, and the stems or shanks of the casters have heretofore been so attached to the floor-plates of the mill as to be practically immovable, and hence greatly interfere with the workmen when repairing the different mechanisms forming parts of the plant.

The object of the invention described herein is to provide such means of attachment of the casters to the floor-plate as will permit of easy and quick removal of the casters, thereby affording a clear floor-space and an equally expeditious readjustment of the casters.

In general terms, the invention consists in the construction and arrangement of mechanical devices or elements, all as more fully hereinafter described and claimed.

Figure 1:
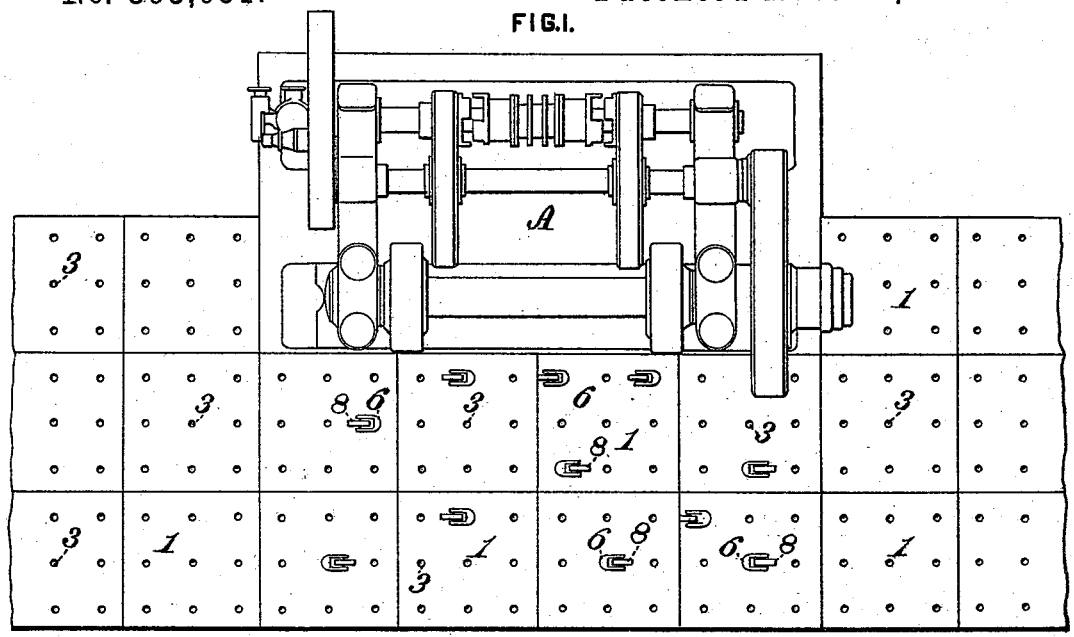
Figure 2:
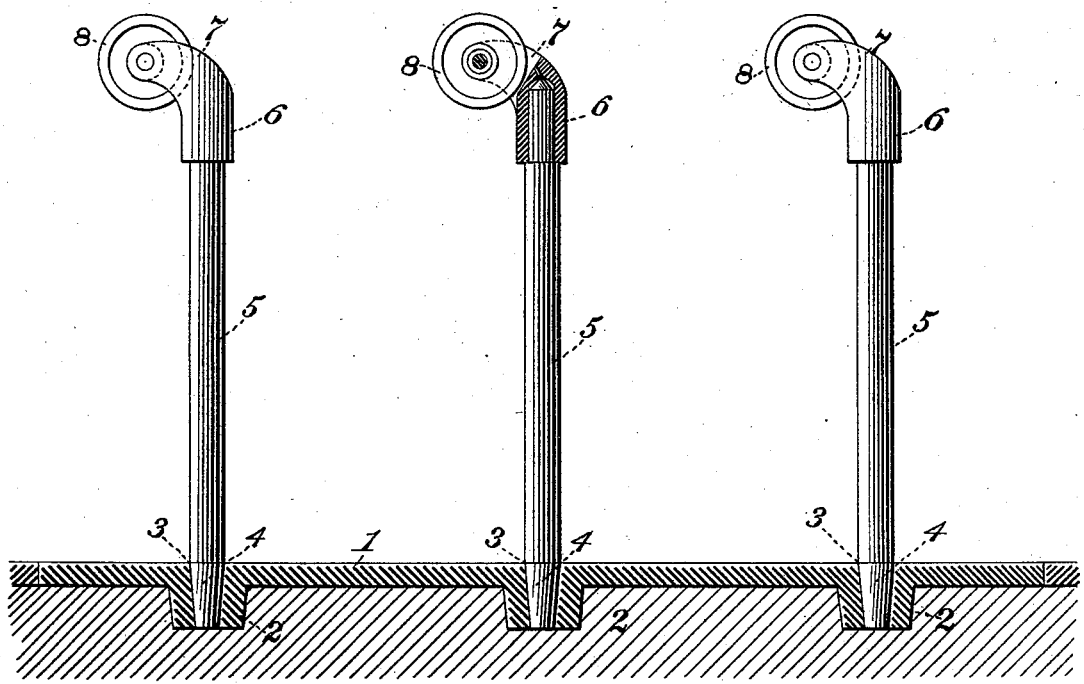

In the accompanying drawings, forming a part of this specification, Figure 1 is a plan view of a portion of a mill-plant, showing the arrangement of the casters relative to one part of the plant—as, for example, the shearing mechanism; and Fig. 2 is a vertical section along a line of the casters, showing the manner of attaching them to the floor-plate.

The floor-plates 1 are formed in the usual manner—*i. e.*, by casting in suitable molds; but in lieu of forming both sides of the plates with a practically uniform or plain surface, a series of bosses or projections, 2, are formed on the under sides of the plates, the number and location of the bosses or projections corresponding to the desired number and location of the casters.

Through the bosses or projections and plates I form conical openings or holes 3, said holes being formed either by properly coring the mold in which the plates are cast or by drilling the holes in the finished plate. In either case the holes should be reamed out, so as to form a firm even seat for the conical end 4 of the stem 5 of the caster. The upper end of the stem 5 is suitably shaped to form a bearing for the socket 6, said socket being adapted to rotate upon the stem, and being provided with arms 7, in which are formed suitable bearings for the axle of the roller 8.

The bosses or projections on the under side of the plates permit of comparatively long bearing being formed for the stems of the casters without unduly increasing the weight of the plates; but a sufficient length of bearing can be attained by increasing the thickness of the floor-plates.

The conical form of the hole and stem is preferred as affording an easier and quicker adjustment of the casters; but, if preferred, the end of the stem and the hole may be made cylindrical, if desired, the stem being provided with a shoulder or stop to prevent too great an insertion of the stem.

It will be readily understood from the foregoing that the casters can be readily removed and placed to one side, leaving a clear floor-space when repairs are necessary around any of the mechanisms A, and can quickly be replaced when required.

I claim herein as my invention—

1. The combination of a mill floor-plate provided with a series of holes constructed to form bearings or sockets for the stems of casters, and a like series of inverted casters having their stems removably arranged in said holes, substantially as set forth.

2. The combination of a mill floor-plate provided with a series of bosses or projections having holes therethrough, and a like series of inverted casters, the stems of said casters removably arranged in said holes, substantially as set forth.

3. The combination of a mill floor-plate provided with a series of bosses or projections, having conical holes formed therethrough, and a like series of inverted casters, the ends of the stems of the casters being shaped to fit in said holes, substantially as set forth.

In testimony whereof I have hereunto set my hand.

HENRY AIKEN.

Witnesses:
DARWIN S. WOLCOTT,
R. H. WHITTLESEY.